(12) United States Patent
Kunick et al.

(10) Patent No.: US 12,055,704 B2
(45) Date of Patent: Aug. 6, 2024

(54) ELECTROWETTING OPTICAL DEVICE

(71) Applicant: CORNING INCORPORATED, Corning, NY (US)

(72) Inventors: Joseph Marshall Kunick, Swanzey, NH (US); Shawn Michael O'Malley, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 657 days.

(21) Appl. No.: 17/284,895

(22) PCT Filed: Oct. 10, 2019

(86) PCT No.: PCT/US2019/055574
§ 371 (c)(1),
(2) Date: Apr. 13, 2021

(87) PCT Pub. No.: WO2020/081350
PCT Pub. Date: Apr. 23, 2020

(65) Prior Publication Data
US 2021/0349306 A1     Nov. 11, 2021

Related U.S. Application Data

(60) Provisional application No. 62/747,304, filed on Oct. 18, 2018.

(51) Int. Cl.
*G02B 26/00* (2006.01)
*G02B 5/20* (2006.01)
*G02F 1/1343* (2006.01)

(52) U.S. Cl.
CPC .......... *G02B 26/005* (2013.01); *G02B 5/208* (2013.01); *G02F 1/134309* (2013.01)

(58) Field of Classification Search
CPC .. G02B 26/005; G02B 5/208; G02F 1/134309
See application file for complete search history.

(56) References Cited

U.S. PATENT DOCUMENTS 7,310,080 B2   12/2007   Jessop
7,460,309 B2   12/2008   Venema
(Continued)

FOREIGN PATENT DOCUMENTS

CA    2688227 A1   11/2008
CA    2992887 A1    1/2017
(Continued)

OTHER PUBLICATIONS

Chinese Patent Application No. 201980078875.4, Office Action dated Nov. 23, 2022, 4 pages (English translation only), Chinese Patent Office.
(Continued)

*Primary Examiner* — Joseph P Martinez
(74) *Attorney, Agent, or Firm* — Tamika A. Crawl-Bey

(57) ABSTRACT

A selective optical shutter can include a first window, a second window, and a cavity disposed between the first window and the second window. A filter can be disposed in an optical path of the optical shutter, whereby the filter blocks of one of ultraviolet (UV) light or infrared (IR) light and passes each of visible light and the other of UV light or IR light. A first liquid and a second liquid can be disposed within the cavity. The first liquid and the second liquid can be substantially immiscible with each other, whereby a liquid interface is formed between the first liquid and the second liquid. The liquid interface can be adjustable by electrowetting to selectively pass visible light or the other of UV light or IR light.

19 Claims, 10 Drawing Sheets

(56) References Cited

U.S. PATENT DOCUMENTS

| | | | |
|---|---|---|---|
| 7,508,566 | B2 | 3/2009 | Feenstra et al. |
| 7,679,833 | B2 | 3/2010 | Kuiper et al. |
| 8,462,408 | B2 | 6/2013 | Kroll et al. |
| 8,514,272 | B2 | 8/2013 | Reichelt |
| 8,520,289 | B2 | 8/2013 | Mueller-Marc et al. |
| 8,523,357 | B2 | 9/2013 | Chou et al. |
| 8,687,147 | B2 | 4/2014 | Chao et al. |
| 8,698,980 | B2 | 4/2014 | Chao et al. |
| 8,773,744 | B2 | 7/2014 | Liang et al. |
| 8,885,018 | B2 | 11/2014 | Smith et al. |
| 8,933,916 | B1 | 1/2015 | Doar et al. |
| 9,013,564 | B2 | 4/2015 | Bathiche et al. |
| 9,018,299 | B2 | 4/2015 | Hosaka et al. |
| 9,042,028 | B2 | 5/2015 | Choi et al. |
| 9,081,174 | B2 | 7/2015 | Hsieh |
| 9,122,050 | B2 | 9/2015 | Cho et al. |
| 9,134,570 | B2 | 9/2015 | Chao et al. |
| 9,164,316 | B2 | 10/2015 | Chao et al. |
| 9,194,979 | B2 | 11/2015 | Miyakawa et al. |
| 9,310,602 | B1 | 4/2016 | Chung et al. |
| 9,310,603 | B2 | 4/2016 | Fan et al. |
| 9,323,066 | B2 | 4/2016 | Bae et al. |
| 9,354,439 | B2 | 5/2016 | Choi et al. |
| 9,942,536 | B2 | 4/2018 | Kroon et al. |
| 2001/0017985 | A1 | 8/2001 | Tsuboi et al. |
| 2005/0270672 | A1 | 12/2005 | Feenstra et al. |
| 2006/0033677 | A1 | 2/2006 | Faase et al. |
| 2007/0031141 | A1 | 2/2007 | Tanaka |
| 2007/0075922 | A1 | 4/2007 | Jessop |
| 2007/0139751 | A1 | 6/2007 | Kuiper et al. |
| 2007/0217021 | A1 | 9/2007 | Hendriks et al. |
| 2007/0217022 | A1 | 9/2007 | Kuiper et al. |
| 2007/0253070 | A1 | 11/2007 | Venema |
| 2008/0204890 | A1 | 8/2008 | Kuiper et al. |
| 2008/0231574 | A1 | 9/2008 | Jessop |
| 2009/0201567 | A1* | 8/2009 | Dobrusskin ......... G02B 26/004 359/290 |
| 2009/0225400 | A1 | 9/2009 | Ansems et al. |
| 2009/0296408 | A1 | 12/2009 | Hendriks et al. |
| 2010/0123946 | A1 | 5/2010 | Mueller-Marc et al. |
| 2010/0128129 | A1 | 5/2010 | Kim |
| 2010/0157026 | A1 | 6/2010 | Reichelt |
| 2010/0214634 | A1 | 8/2010 | Kroll et al. |
| 2010/0220044 | A1 | 9/2010 | Jessop |
| 2010/0296143 | A1 | 11/2010 | Reichelt et al. |
| 2010/0309204 | A1 | 12/2010 | Smith et al. |
| 2012/0194563 | A1 | 8/2012 | Liang et al. |
| 2012/0249537 | A1 | 10/2012 | Bae et al. |
| 2013/0038922 | A1 | 2/2013 | Kirita |
| 2013/0120678 | A1 | 5/2013 | Chao et al. |
| 2013/0120688 | A1 | 5/2013 | Chao et al. |
| 2013/0201547 | A1 | 8/2013 | Cho et al. |
| 2013/0250211 | A1 | 9/2013 | Chao et al. |
| 2014/0049808 | A1 | 2/2014 | Yang |
| 2014/0125898 | A1 | 5/2014 | Chao et al. |
| 2014/0126038 | A1 | 5/2014 | Choi et al. |
| 2014/0132724 | A1 | 5/2014 | Choi et al. |
| 2014/0154404 | A1 | 6/2014 | Hsieh |
| 2014/0332736 | A1 | 11/2014 | Miyakawa et al. |
| 2014/0333735 | A1 | 11/2014 | Bathiche et al. |
| 2014/0374668 | A1 | 12/2014 | Hosaka et al. |
| 2015/0172564 | A1 | 6/2015 | Fan et al. |
| 2016/0021361 | A1 | 1/2016 | Kroon et al. |
| 2016/0195709 | A1 | 7/2016 | Kinoshita et al. |
| 2017/0010406 | A1 | 1/2017 | Lee et al. |
| 2017/0018214 | A1 | 1/2017 | Black et al. |
| 2017/0045203 | A1 | 2/2017 | Mao et al. |
| 2017/0109865 | A1 | 4/2017 | Kim et al. |
| 2017/0163946 | A1 | 6/2017 | Komanduri et al. |

FOREIGN PATENT DOCUMENTS

| | | |
|---|---|---|
| CA | 2992903 A1 | 2/2017 |
| CN | 1831567 A | 9/2006 |
| CN | 1942805 A | 4/2007 |
| CN | 101512412 A | 8/2009 |
| EP | 1543370 A1 | 6/2005 |
| EP | 1735646 A2 | 12/2006 |
| EP | 1735654 A1 | 12/2006 |
| EP | 1798958 A1 | 6/2007 |
| EP | 1825316 A1 | 8/2007 |
| EP | 1851579 A2 | 11/2007 |
| EP | 1889100 A2 | 2/2008 |
| EP | 1988420 A1 | 11/2008 |
| EP | 2156248 A1 | 2/2010 |
| EP | 2187375 A1 | 5/2010 |
| EP | 2592666 A1 | 5/2013 |
| EP | 2624319 A2 | 8/2013 |
| EP | 2730963 A1 | 5/2014 |
| EP | 3325400 A1 | 5/2018 |
| GB | 2457691 A | 8/2009 |
| JP | 2009-141733 A | 6/2009 |
| JP | 4851089 B2 | 1/2012 |
| JP | 4882987 B2 | 2/2012 |
| JP | 4886773 B2 | 2/2012 |
| JP | 2012-068332 A | 4/2012 |
| JP | 2013-080106 A | 5/2013 |
| JP | 2013-101297 A | 5/2013 |
| JP | 2013-142753 A | 7/2013 |
| JP | 5244695 B2 | 7/2013 |
| JP | 5282992 B1 | 9/2013 |
| JP | 5344272 B1 | 11/2013 |
| JP | 5346335 B2 | 11/2013 |
| JP | 2014-044356 A | 3/2014 |
| JP | 2014-056150 A | 3/2014 |
| JP | 2014-102330 A | 6/2014 |
| JP | 2014-214217 A | 11/2014 |
| JP | 2015-018243 A | 1/2015 |
| JP | 5811299 B1 | 11/2015 |
| JP | 5838145 B2 | 12/2015 |
| JP | 6118293 B2 | 4/2017 |
| RU | 2015143214 A | 4/2017 |
| WO | 2004/027489 A1 | 4/2004 |
| WO | 2005/096026 A2 | 10/2005 |
| WO | 2005/096070 A1 | 10/2005 |
| WO | 2006/061753 A1 | 6/2006 |
| WO | 2006/067653 A2 | 6/2006 |
| WO | 2006/123288 A2 | 11/2006 |
| WO | 2008/116812 A1 | 10/2008 |
| WO | 2008/142108 A1 | 11/2008 |
| WO | 2009/104818 A1 | 8/2009 |
| WO | 2013/065485 A1 | 5/2013 |
| WO | 2013/081001 A1 | 6/2013 |
| WO | 2014/182559 A1 | 11/2014 |
| WO | 2017/015051 A1 | 1/2017 |
| WO | 2017/027698 A1 | 2/2017 |
| WO | 2017/095789 A1 | 6/2017 |
| WO | 2018/075610 A1 | 4/2018 |

OTHER PUBLICATIONS

Hellma Analytics Certified UV/Vis Reference Materials, 52 pages, E.

Hellma Analytics Certified UVVis Reference Materials, 52 pages, E1.

Marti Duocastella et al., "Three-dimensional particle tracking via tunable color-encoded multiplexing," Optics letters vol. 41, No. 5, Mar. 1, 2016, pp. 863-866 (2016).

Semrock "Measurements of Optical Filter Spectra" Technical Note series pp. 11.

Turan Erdogan, "Optical Filters: Blocking" Semrock, A Unit of IDEX Corporation, May 2011, pp. 9.

Tzeng et al.J, "Contourlet Domain Multiband Deblurring Based on Color Correlation for Fluid Lens Cameras", IEEE Transactions on Image Processing, vol. 19, No. 10, Oct. 2010 20423801, pp. 2659-2667.

Visible Light Absorber, 1 pg., website.

(56) References Cited

OTHER PUBLICATIONS

International Search Report and Written Opinion of the International Searching Authority; PCT/US19/055574; Mailed Feb. 27, 2020; 8 Pages; European Patent Office.

* cited by examiner

ELECTROWETTING OPTICAL DEVICE

CROSS-REFERENCE TO RELATED APPLICATIONS

This application claims the benefit of priority under 35 U.S.C. § 371 of International Application No. PCT/US2019/055574, filed on Oct. 10, 2019, which claims the benefit of priority under 35 U.S.C. § 119 of U.S. Provisional Application No. 62/747,304, filed Oct. 18, 2018, the content of each of which is incorporated herein by reference in its entirety.

BACKGROUND

1. Field

This disclosure relates to optical devices, and more particularly, to optical devices comprising liquid interfaces that are adjustable by electrowetting.

2. Technical Background

Electrowetting-based optical devices generally include two immiscible liquids disposed within a chamber. Varying the electric field to which the liquids are subjected can vary the wettability of one of the liquids with respect to the chamber wall, thereby varying the shape of the meniscus formed between the two liquids.

SUMMARY

Disclosed herein are optical devices comprising liquid interfaces that are adjustable by electrowetting.

Disclosed herein is an optical device comprising a first window, a second window, and a cavity disposed between the first window and the second window. A first liquid and a second liquid can be disposed within the cavity. The first liquid and the second liquid can be substantially immiscible with each other, whereby a liquid interface is formed between the first liquid and the second liquid. A common electrode can be in electrical communication with the first liquid. A driving electrode can be disposed on a sidewall of the cavity and insulated from the first liquid and the second liquid. The first liquid can be attenuating of electromagnetic radiation within a first wavelength band. The second liquid can be attenuating of electromagnetic radiation within a second wavelength band that is different than the first wavelength band. Upon passing image radiation through the optical device in a direction from an object side of the optical device toward an image side of the optical device, adjusting a voltage differential between the common electrode and the driving electrode can cause movement of the liquid interface between (a) a first position in which the optical device blocks each of a first portion of the image radiation falling within the first wavelength band and a second portion of the image radiation falling within the second wavelength band or passes each of the first portion of the image radiation falling within the first wavelength band and the second portion of the image radiation falling within the second wavelength band and (b) a second position in which the optical device blocks one of the first portion of the image radiation falling within the first wavelength band or the second portion of the image radiation falling within the second wavelength band and passes the other of the first portion of the image radiation falling within the first wavelength band or the second portion of the image radiation falling within the second wavelength band. Such an optical device can function as a wavelength selective optical shutter as described herein.

Disclosed herein is a selective optical shutter comprising a first window, a second window, and a cavity disposed between the first window and the second window. A first liquid and a second liquid can be disposed within the cavity. The first liquid and the second liquid can be substantially immiscible with each other, whereby a liquid interface is formed between the first liquid and the second liquid. The liquid interface can be adjustable by electrowetting between (a) a first position in which the optical device passes visible light and blocks each of ultraviolet (UV) light and infrared (IR) light and (b) a second position in which the optical device passes visible light and one of UV light or IR light and blocks the other of UV light or IR light.

Disclosed herein is a selective optical shutter comprising a first window, a second window, and a cavity disposed between the first window and the second window. A filter can be disposed in an optical path of the optical shutter, whereby the filter blocks of one of ultraviolet (UV) light or infrared (IR) light and passes each of visible light and the other of UV light or IR light. A first liquid and a second liquid can be disposed within the cavity. The first liquid and the second liquid can be substantially immiscible with each other, whereby a liquid interface is formed between the first liquid and the second liquid. The liquid interface can be adjustable by electrowetting to selectively pass visible light or the other of UV light or IR light.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
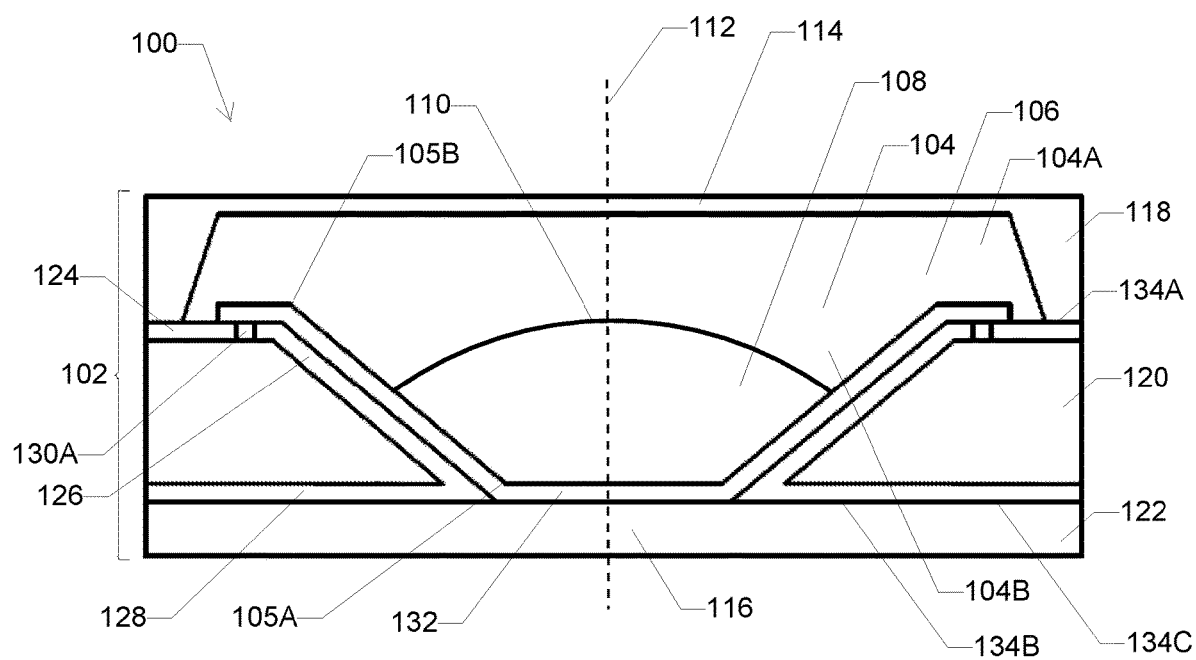
FIG. 1 is a schematic cross-sectional view of some embodiments of an optical device.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

As used herein, the term "molar attenuation coefficient" is a measure of how strongly a substance attenuates light at a particular wavelength and is generally expressed in units of liters per mol per centimeter (L·mol$^{-1}$·cm$^{-1}$). The term "molar extinction coefficient" can be used interchangeably with the term molar attenuation coefficient.

In various embodiments, an optical device comprises a first window, a second window, and a cavity disposed between the first window and the second window. In some embodiments, a first liquid and a second liquid are disposed within the cavity, and the first liquid and the second liquid are substantially immiscible with each other, whereby a liquid interface is formed between the first liquid and the second liquid. In some embodiments, a common electrode is in electrical communication with the first liquid, and a driving electrode is disposed on a sidewall of the cavity and insulated from the first liquid and the second liquid. The first liquid can be attenuating of electromagnetic radiation within a first wavelength band, and the second liquid can be attenuating of electromagnetic radiation within a second wavelength band that is different than the first wavelength band. In some embodiments, upon passing image radiation through the optical device in a direction from an object side of the optical device toward an image side of the optical device, adjusting a voltage differential between the common electrode and the driving electrode causes movement of the liquid interface between (a) a first position in which the optical device blocks each of a first portion of the image radiation falling within the first wavelength band and a second portion of the image radiation falling within the second wavelength band or passes each of the first portion of the image radiation falling within the first wavelength band and the second portion of the image radiation falling within the second wavelength band and (b) a second position in which the optical device blocks one of the first portion of the image radiation falling within the first wavelength band or the second portion of the image radiation falling within the second wavelength band and passes the other of the first portion of the image radiation falling within the first wavelength band or the second portion of the image radiation falling within the second wavelength band. Such an optical device can function as a wavelength selective optical shutter as described herein.

FIG. 1 is a schematic cross-sectional view of some embodiments of an optical device 100. In some embodiments, optical device 100 comprises a body 102 and a cavity 104 formed in the body. A first liquid 106 and a second liquid 108 are disposed within cavity 104. In some embodiments, first liquid 106 is a polar liquid or a conducting liquid. Additionally, or alternatively, second liquid 108 is a nonpolar liquid or an insulating liquid. In some embodiments, a liquid interface 110 is disposed between the first liquid and the second liquid. For example, first liquid 106 and second liquid 108 are immiscible with each other, whereby liquid interface 110 is formed between the first liquid and the second liquid. Additionally, or alternatively, first liquid 106 and second liquid 108 are separated from each other by a membrane disposed at liquid interface 110. First liquid 106 and second liquid 108 can have the same or different refractive indices. For example, first liquid 106 and second liquid 108 have different refractive indices such that interface 110 forms a lens. Interface 110 with optical power can be beneficial for use as a variable focus and/or variable tilt lens (e.g., by changing the shape of the interface as described herein). Alternatively, first liquid 106 and second liquid 108 have the same or substantially the same refractive indices such that interface 110 has little or no optical power. Interface 110 with little or no optical power can be beneficial for use as a shutter as described herein that can be opened or closed without substantially changing the optical path of image radiation passing through optical device 100. In some embodiments, first liquid 106 and second liquid 108 have substantially the same density, which can help to avoid changes in the shape of interface 110 as a result of changing the physical orientation of optical device 100 (e.g., as a result of gravitational forces).

In some embodiments, cavity 104 comprises a first portion, or headspace, 104A and a second portion, or base portion, 104B. For example, second portion 104B of cavity 104 is defined by a bore in an intermediate layer of optical device 100 as described herein. Additionally, or alternatively, first portion 104A of cavity 104 is defined by a recess in a first outer layer of optical device 100 and/or disposed outside of the bore in the intermediate layer as described herein. In some embodiments, at least a portion of first liquid 106 is disposed in first portion 104A of cavity 104. Additionally, or alternatively, second liquid 108 is disposed within second portion 104B of cavity 104. For example, substantially all or a portion of second liquid 108 is disposed within second portion 104B of cavity 104. In some embodiments, the perimeter of interface 110 (e.g., the edge of the interface in contact with the sidewall of the cavity) is disposed within second portion 104B of cavity 104.

Interface 110 can be adjusted via electrowetting. For example, a voltage can be applied between first liquid 106 and a surface of cavity 104 (e.g., an electrode positioned near the surface of the cavity and insulated from the first liquid as described herein) to increase or decrease the wettability of the surface of the cavity with respect to the first liquid and change the shape of interface 110. In some embodiments, adjusting interface 110 changes the shape of the interface, which can change the focal length or focus of optical device 100 and/or the optical transmission of the optical device as described herein. A change of focal length can enable optical device 100 to perform an autofocus function. Additionally, or alternatively, adjusting interface 110 tilts the interface relative to an optical axis 112 of optical device 100 (e.g., to perform an optical image stabilization (OIS) function and/or a beam steering function). Additionally, or alternatively, a change of optical transmission can enable optical device 100 to selectively pass or block image radiation of one or more particular wavelengths (e.g., to perform a selective optical shutter function). Adjusting interface 110 can be achieved without physical movement of optical device 100 relative to an image sensor, a fixed lens or lens stack, a housing, a display, or other components of an imaging device in which the optical device can be incorporated.

In some embodiments, body 102 of optical device 100 comprises a first window 114 and a second window 116. In some of such embodiments, cavity 104 is disposed between first window 114 and second window 116. In some embodiments, body 102 comprises a plurality of layers that cooperatively form the body. For example, in the embodiments shown in FIG. 1, body 102 comprises a first outer layer 118, an intermediate layer 120, and a second outer layer 122. In some of such embodiments, intermediate layer 120 comprises a bore formed therethrough. First outer layer 118 can be bonded to one side (e.g., the object side) of intermediate layer 120. For example, first outer layer 118 is bonded to intermediate layer 120 at a bond 134A. Bond 134A can be an adhesive bond, a laser bond (e.g., a laser weld), or another suitable bond capable of maintaining first liquid 106 and second liquid 108 within cavity 104. Additionally, or alternatively, second outer layer 122 can be bonded to the other side (e.g., the image side) of intermediate layer 120. For example, second outer layer 122 is bonded to intermediate layer 120 at a bond 134B and/or a bond 134C, each of which can be configured as described herein with respect to bond 134A. In some embodiments, intermediate layer 120 is disposed between first outer layer 118 and second outer layer 122, the bore in the intermediate layer is covered on opposing sides by the first outer layer and the second outer layer, and at least a portion of cavity 104 is defined within the bore. Thus, a portion of first outer layer 118 covering cavity 104 serves as first window 114, and a portion of second outer layer 122 covering the cavity serves as second window 116.

In some embodiments, cavity 104 comprises first portion 104A and second portion 104B. For example, in the embodiments shown in FIG. 1, second portion 104B of cavity 104 is defined by the bore in intermediate layer 120, and first portion 104A of the cavity is disposed between the second portion of the cavity and first window 114. In some embodiments, first outer layer 118 comprises a recess as shown in FIG. 1, and first portion 104A of cavity 104 is disposed within the recess in the first outer layer. Thus, first portion 104A of cavity 104 is disposed outside of the bore in intermediate layer 120.

In some embodiments, cavity 104, or a portion thereof (e.g., second portion 104B of the cavity), is tapered as shown in FIG. 1 such that a cross-sectional area of the cavity decreases along optical axis 112 in a direction from the object side to the image side. For example, second portion 104B of cavity 104 comprises a narrow end 105A and a wide end 105B. The terms "narrow" and "wide" are relative terms, meaning the narrow end is narrower than the wide end. Such a tapered cavity can help to maintain alignment of interface 110 between first liquid 106 and second liquid 108 along optical axis 112. In other embodiments, the cavity is tapered such that the cross-sectional area of the cavity increases along the optical axis in the direction from the object side to the image side or non-tapered such that the cross-sectional area of the cavity remains substantially constant along the optical axis (e.g., as shown and described in reference to FIGS. 4-8 and 11).

In some embodiments, image radiation enters optical device 100 through first window 114, passes through first liquid 106, interface 110, and/or second liquid 108, and exits the optical device through second window 116. In some embodiments, first outer layer 118 and/or second outer layer 122 comprise a sufficient transparency to enable passage of the image radiation. For example, first outer layer 118 and/or second outer layer 122 comprise a polymeric, glass, ceramic, or glass-ceramic material. In some embodiments, outer surfaces of first outer layer 118 and/or second outer layer 122 are substantially planar. In other embodiments, outer surfaces of the first outer layer and/or the second outer layer are curved (e.g., concave or convex). Thus, the optical device comprises an integrated fixed lens. In some embodiments, intermediate layer 120 comprises a metallic, polymeric, glass, ceramic, or glass-ceramic material. Because image radiation can pass through the bore in intermediate layer 120, the intermediate layer may or may not be transparent.

Although body 102 of optical device 100 is described as comprising first outer layer 118, intermediate layer 120, and second outer layer 122, other embodiments are included in this disclosure. For example, in some other embodiments, one or more of the layers is omitted. For example, the bore in the intermediate layer can be configured as a blind hole that does not extend entirely through the intermediate layer, and the second outer layer can be omitted. Although first portion 104A of cavity 104 is described herein as being disposed within the recess in first outer layer 118, other embodiments are included in this disclosure. For example, in some other embodiments, the recess is omitted, and the first portion of the cavity is disposed within the bore in the intermediate layer. Thus, the first portion of the cavity is an upper portion of the bore, and the second portion of the cavity is a lower portion of the bore. In some other embodiments, the first portion of the cavity is disposed partially within the bore in the intermediate layer and partially outside the bore.

In some embodiments, optical device 100 comprises a common electrode 124 in electrical communication with first liquid 106. Additionally, or alternatively, optical device 100 comprises a driving electrode 126 disposed on a sidewall of cavity 104 and insulated from first liquid 106 and second liquid 108. Different voltages can be supplied to common electrode 124 and driving electrode 126 (e.g., a voltage differential can be applied between the common electrode and the driving electrode) to change the shape of interface 110 as described herein.

In some embodiments, optical device 100 comprises a conductive layer 128 at least a portion of which is disposed within cavity 104. For example, conductive layer 128 comprises a conductive coating applied to intermediate layer 120 prior to bonding first outer layer 118 and/or second outer layer 122 to the intermediate layer. Conductive layer 128 can comprise a metallic material, a conductive polymer material, another suitable conductive material, or a combination thereof. Additionally, or alternatively, conductive layer 128 can comprise a single layer or a plurality of layers, some or all of which can be conductive. In some embodiments, conductive layer 128 defines common electrode 124 and/or driving electrode 126. For example, conductive layer 128 can be applied to substantially the entire outer surface of intermediate layer 118 prior to bonding first outer layer 118 and/or second outer layer 122 to the intermediate layer. Following application of conductive layer 128 to intermediate layer 118, the conductive layer can be segmented into various conductive elements (e.g., common electrode 124 and/or driving electrode 126 as described herein). In some embodiments, optical device 100 comprises a scribe 130A in conductive layer 128 to isolate (e.g., electrically isolate) common electrode 124 and driving electrode 126 from each other. In some embodiments, scribe 130A comprises a gap in conductive layer 128. For example, scribe 130A is a gap with a width of about 5 µm, about 10 µm, about 15 µm, about 20 µm, about 25 µm, about 30 µm, about 35 µm, about 40 µm, about 45 µm, about 50 µm, or any ranges defined by the listed values.

In some embodiments, optical device 100 comprises an insulating layer 132 disposed within cavity 104. For example, insulating layer 132 comprises an insulating coating applied to intermediate layer 120 prior to bonding first outer layer 118 and/or second outer layer 122 to the intermediate layer. In some embodiments, insulating layer 132 comprises an insulating coating applied to conductive layer 128 and second window 116 after bonding second outer layer 122 to intermediate layer 120 and prior to bonding first outer layer 118 to the intermediate layer. Thus, insulating layer 132 covers at least a portion of conductive layer 128 within cavity 104 and second window 116. In some embodiments, insulating layer 132 can be sufficiently transparent to enable passage of image radiation through second window 116 as described herein. Insulating layer 132 can comprise polytetrafluoroethylene (PTFE), parylene, another suitable polymeric or non-polymeric insulating material, or a combination thereof. Additionally, or alternatively, insulating layer 132 comprises a hydrophobic material. Additionally, or alternatively, insulating layer 132 can comprise a single layer or a plurality of layers, some or all of which can be insulating. In some embodiments, insulating layer 132 covers at least a portion of driving electrode 126 (e.g., the portion of the driving electrode disposed within cavity 104) to insulate first liquid 106 and second liquid 108 from the driving electrode. Additionally, or alternatively, at least a portion of common electrode 124 disposed within cavity 104 is uncovered by insulating layer 132. Thus, common electrode 124 can be in electrical communication with first liquid 106 as described herein. In some embodiments, insulating layer 132 comprises a hydrophobic surface layer of second portion 104B of cavity 104. Such a hydrophobic surface layer can help to maintain second liquid 108 within second portion 104B of cavity 104 (e.g., by attraction between the non-polar second liquid and the hydrophobic material) and/or enable the perimeter of interface 110 to move along the hydrophobic surface layer (e.g., by electrowetting) to change the shape of the interface as described herein.

Figure 2:
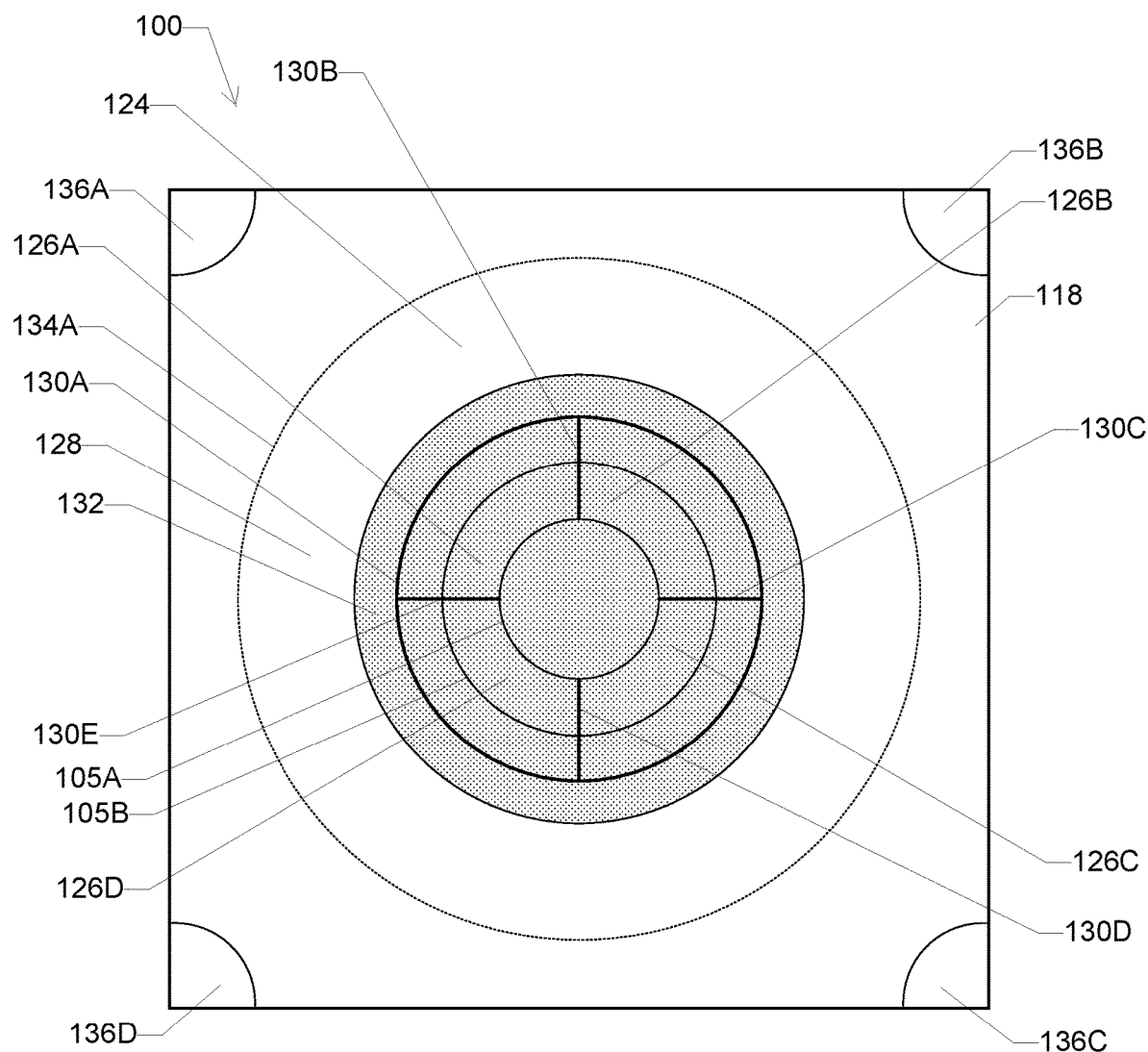
FIG. 2 is a schematic front view of the optical device of FIG. 1 looking through a first outer layer of the optical device.
Figure 3:
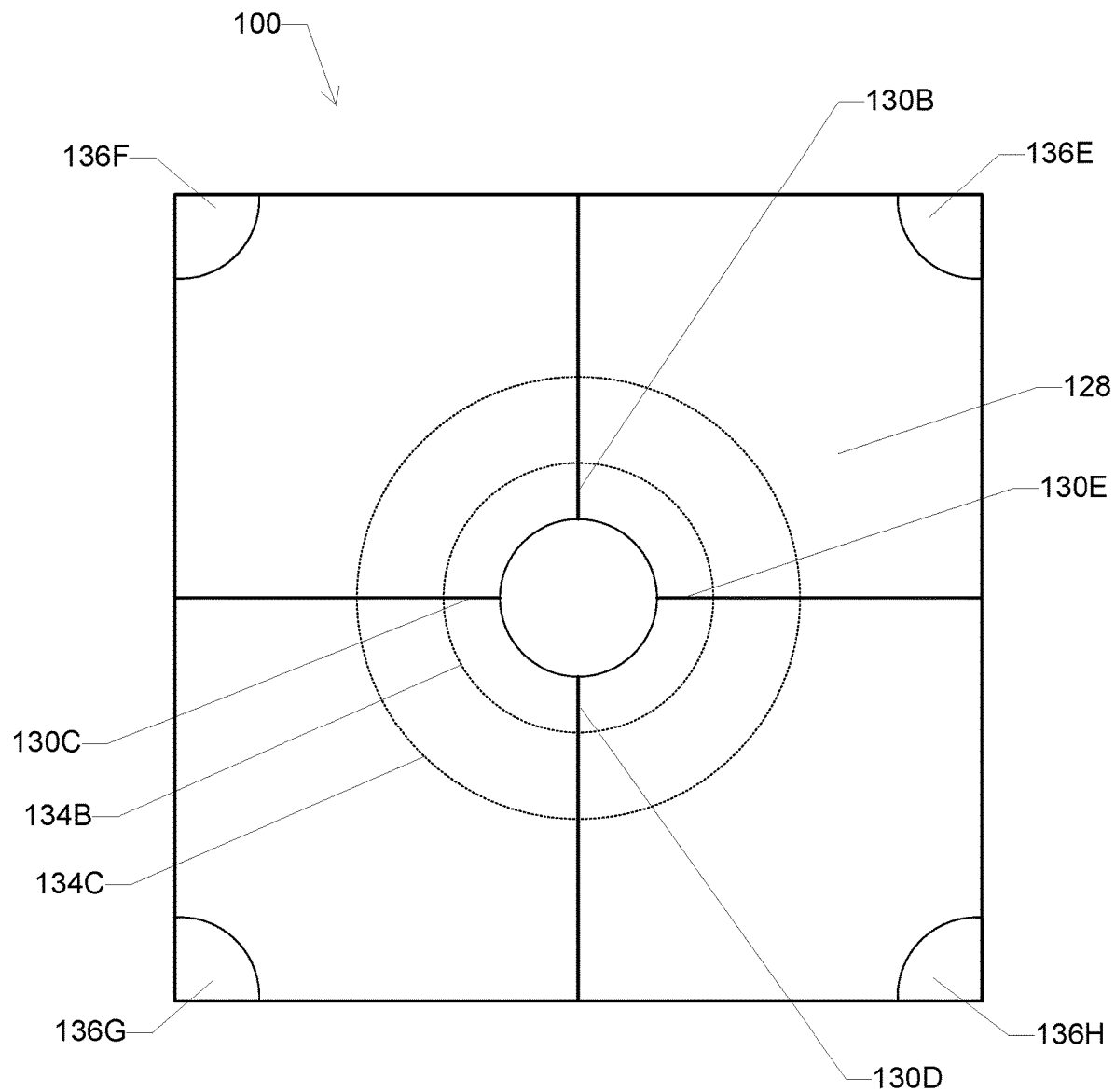
FIG. 3 is a schematic rear view of the optical device of FIG. 1 looking through a second outer layer of the optical device.

FIG. 2 is a schematic front view of optical device 100 looking through first outer layer 118, and FIG. 3 is a schematic rear view of the optical device looking through second outer layer 122. For clarity in FIGS. 2 and 3, and with some exceptions, bonds generally are shown in dashed lines, scribes generally are shown in heavier lines, and other features generally are shown in lighter lines.

In some embodiments, common electrode 124 is defined between scribe 130A and bond 134A, and a portion of the common electrode is uncovered by insulating layer 132 such that the common electrode can be in electrical communication with first liquid 106 as described herein. In some embodiments, bond 134A is configured such that electrical continuity is maintained between the portion of conductive layer 128 inside the bond (e.g., inside cavity 104) and the portion of the conductive layer outside the bond. In some embodiments, optical device 100 comprises one or more cutouts 136 in first outer layer 118. For example, in the embodiments shown in FIG. 2, optical device 100 comprises a first cutout 136A, a second cutout 136B, a third cutout 136C, and a fourth cutout 136D. In some embodiments, cutouts 136 comprise portions of optical device 100 at which first outer layer 118 is removed to expose conductive layer 128. Thus, cutouts 136 can enable electrical connection to common electrode 124, and the regions of conductive layer 128 exposed at cutouts 136 can serve as contacts to enable electrical connection of optical device 100 to a controller, a driver, or another component of a lens or camera system.

In some embodiments, driving electrode 126 comprises a plurality of driving electrode segments. For example, in the embodiments shown in FIGS. 2 and 3, driving electrode 126 comprises a first driving electrode segment 126A, a second driving electrode segment 126B, a third driving electrode segment 126C, and a fourth driving electrode segment 126D. In some embodiments, the driving electrode segments are distributed substantially uniformly about the sidewall of cavity 104. For example, each driving electrode segment occupies about one quarter, or one quadrant, of the sidewall of second portion 104B of cavity 104. In some embodiments, adjacent driving electrode segments are isolated from each other by a scribe. For example, first driving electrode segment 126A and second driving electrode segment 126B are isolated from each other by a scribe 130B. Additionally, or alternatively, second driving electrode segment 126B and third driving electrode segment 126C are isolated from each other by a scribe 130C. Additionally, or alternatively, third driving electrode segment 126C and fourth driving electrode segment 126D are isolated from each other by a scribe 130D. Additionally, or alternatively, fourth driving electrode segment 126D and first driving electrode segment 126A are isolated from each other by a scribe 130E. The various scribes 130 can be configured as described herein in reference to scribe 130A. In some embodiments, the scribes between the various electrode segments extend beyond cavity 104 and onto the back side of optical device 100 as shown in FIG. 3. Such a configuration can ensure electrical isolation of the adjacent driving electrode segments from each other. Additionally, or alternatively, such a configuration can enable each driving electrode segment to have a corresponding contact for electrical connection as described herein.

Although driving electrode 126 is described herein in reference to FIGS. 1-3 as being divided into four driving electrode segments, other embodiments are included in this disclosure. In some other embodiments, the driving electrode comprises a single electrode (e.g., an undivided driving electrode). In some other embodiments, the driving electrode is divided into two, three, five, six, seven, eight, or more driving electrode segments.

In some embodiments, bond 134B and/or bond 134C are configured such that electrical continuity is maintained between the portion of conductive layer 128 inside the respective bond and the portion of the conductive layer outside the respective bond. In some embodiments, optical device 100 comprises one or more cutouts 136 in second outer layer 122. For example, in the embodiments shown in FIG. 3, optical device 100 comprises a fifth cutout 136E, a sixth cutout 136F, a seventh cutout 136G, and an eighth cutout 136H. In some embodiments, cutouts 136 comprise portions of optical device 100 at which second outer layer 122 is removed to expose conductive layer 128. Thus, cutouts 136 can enable electrical connection to driving electrode 126, and the regions of conductive layer 128 exposed at cutouts 136 can serve as contacts to enable electrical connection of optical device 100 to a controller, a driver, or another component of a lens or camera system.

Different driving voltages can be supplied to different driving electrode segments to tilt the interface of the optical device (e.g., for OIS functionality). Additionally, or alternatively, the same driving voltage can be supplied to each driving electrode segment to maintain the interface of the optical device in a substantially spherical orientation about the optical axis (e.g., for autofocus functionality).

Figure 4:
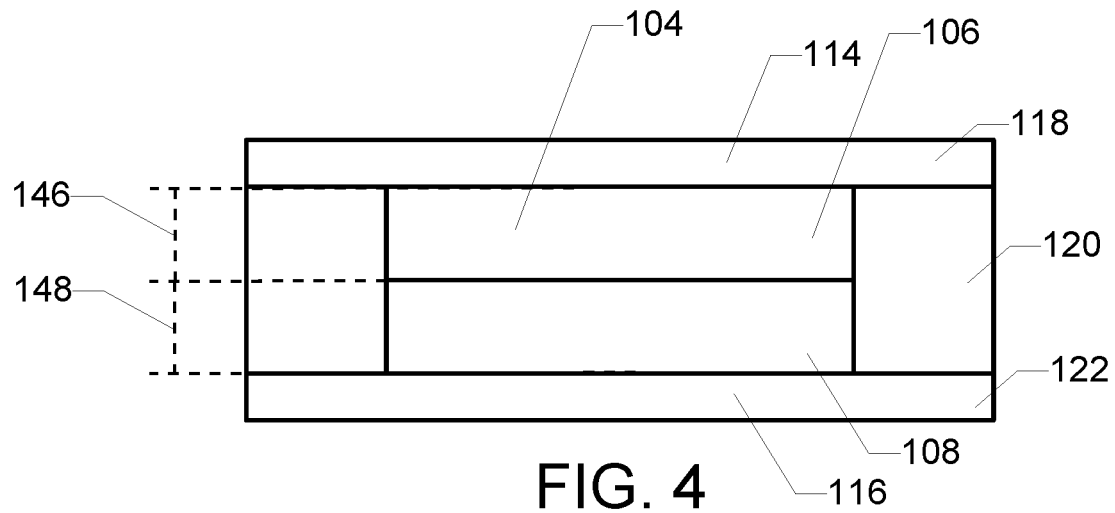
FIGS. 4-6 are schematic cross-sectional views of some embodiments of an optical device with a liquid interface in first, second, and third positions, respectively.
Figure 5:
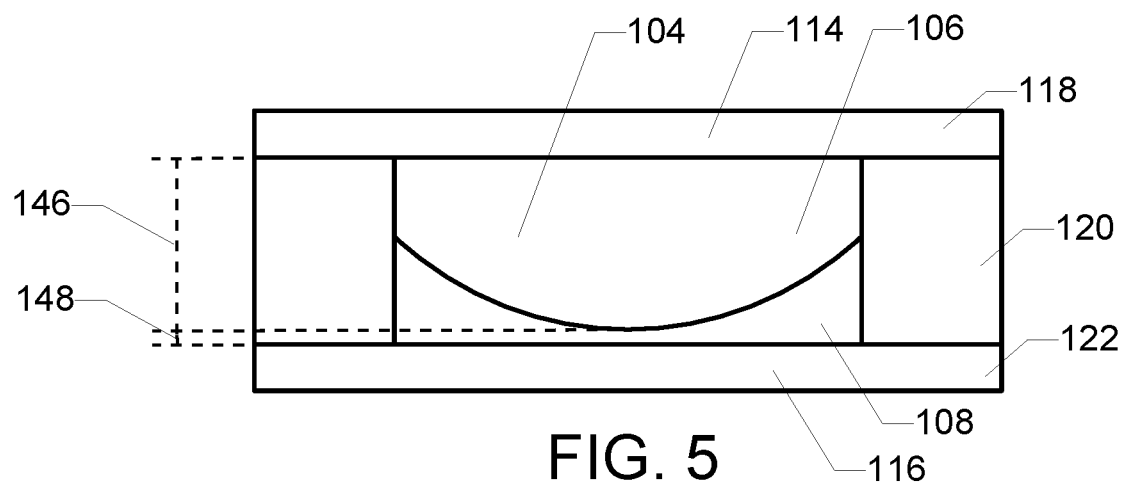
Figure 6:
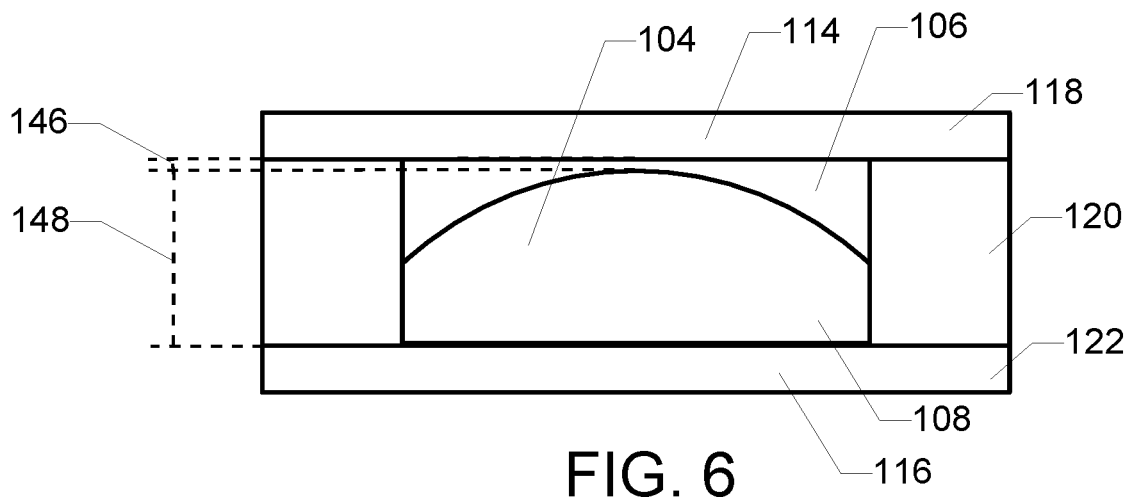

FIGS. 4-6 are schematic cross-sectional views of some embodiments of optical device 100 with interface 110 in first, second, and third positions, respectively. In some embodiments, optical device 100 can function as a selective optical shutter as described herein. Optical device 100 shown in FIGS. 4-6 can be substantially similar to the optical device shown and described in reference to FIGS. 1-3. For example, optical device 100 comprises first window 114, second window 116, and cavity 104 disposed between the first window and the second window as shown in FIGS. 4-6. In some embodiments, first liquid 106 and second liquid 108 are disposed within cavity 104. First liquid 106 and second liquid 108 can be substantially immiscible with each other, whereby liquid interface 110 is formed between the first liquid and the second liquid. In some embodiments, optical device 100 comprises common electrode 124 in electrical communication with first liquid 106, and driving electrode 126 disposed on a sidewall of cavity 104 and insulated from the first liquid and second liquid 108, although the electrodes and insulating layer 132 are not shown in FIGS. 4-6.

In some embodiments, first liquid 106 is attenuating of electromagnetic radiation within a first wavelength band. For example, the first wavelength band comprises ultraviolet (UV) radiation having a wavelength ranging from about 10 nm to about 400 nm or about 10 nm to about 390 nm, ultraviolet A (UVA) radiation having a wavelength ranging from about 315 nm to about 400 nm or about 315 nm to about 390 nm, ultraviolet B (UVB) radiation having a wavelength ranging from about 280 nm to about 315 nm, ultraviolet C (UVC) radiation having a wavelength ranging from about 100 nm to about 280 nm, visible light having a wavelength ranging from about 390 nm to about 700 nm or from about 400 nm to about 700 nm, violet light having a wavelength ranging from about 380 nm to about 450 nm, or about 390 nm to about 450 nm, or about 400 nm to about 450 nm, blue light having a wavelength ranging from about 450 nm to about 495 nm, green light having a wavelength ranging from about 495 nm to about 570 nm, yellow light having a wavelength ranging from about 570 nm to about 590 nm, orange light having a wavelength ranging from about 590 nm to about 620 nm, red light having a wavelength ranging from about 620 nm to about 750 nm, infrared (IR) radiation having a wavelength ranging from about 700 nm to about 1 mm, a subset of IR radiation having a wavelength ranging from about 700 nm to about 1 µm, or from about 700 nm to about 2.5 µm, or from about 954 nm to about 1166 nm (e.g., 1060 nm±10%), or from about 846 nm to about 1034 nm (e.g., 940 nm±10%), near-infrared (NIR) radiation having a wavelength ranging from about 780 nm to about 3 µm, mid-infrared (MIR) radiation having a wavelength ranging from about 3 µm to about 50 µm, far infrared (FIR) radiation having a wavelength ranging from about 50 µm to about 1 mm, another suitable wavelength range, a subrange thereof, or a combination thereof. In some embodiments, first liquid 106 selectively attenuates electromagnetic radiation falling within the first wavelength band without substantially attenuating electromagnetic radiation falling outside the first wavelength band. For example, first liquid 106 (at sufficient path length) blocks or filters electromagnetic radiation falling within the first wavelength band (e.g., by absorption, reflection, or another attenuation mechanism) while passing electromagnetic radiation falling outside the first wavelength band.

In some embodiments, second liquid 108 is attenuating of electromagnetic radiation within a second wavelength band. The second wavelength band can comprise any wavelength ranges described herein in reference to the first wavelength band, and can be different than the first wavelength band. In some embodiments, second liquid 108 selectively attenuates electromagnetic radiation falling within the second wavelength band without substantially attenuating electromagnetic radiation falling outside the second wavelength band. For example, second liquid 108 (at sufficient path length) blocks or filters electromagnetic radiation falling within the second wavelength band (e.g., by absorption, reflection, or another attenuation mechanism) while passing electromagnetic radiation falling outside the second wavelength band.

In some embodiments, image radiation travels through optical device 100 generally along optical axis 112 in the direction from the object side to the image side of the optical device. For example, image radiation enters optical device 100 through first window 114, passes through first liquid 106, interface 110, and/or second liquid 108, and exits the optical device through second window 116. In some embodiments, optical device 100 blocks a portion of the image radiation falling within a particular wavelength band when the transmission of the image radiation falling within that particular wavelength band through the optical device is less than 50%, about 40%, about 30%, about 20%, about 10%, about 5%, about 1%, about 0.1%, about 0.01%, about 0%, or any ranges defined by any of the listed values. Additionally, or alternatively, optical device 100 passes a portion of the image radiation falling within a particular wavelength band when the transmission of the image radiation falling within that particular wavelength band through the optical device is greater than 50%, about 60%, about 70%, about 80%, about 90%, about 95%, about 100%, or any ranges defined by any of the listed values. The transmission of the image radiation falling within a particular wavelength band can refer to an average transmission over the particular wavelength band or the transmission at all wavelengths falling within the particular wavelength band.

In some embodiments, first liquid 106 and second liquid 108 selectively attenuate electromagnetic radiation falling within different wavelength bands as described herein. Such selective attenuation can enable the transmission properties of optical device 100 to be adjusted. For example, the position of interface 110 can be adjusted to change the wavelength band(s) of electromagnetic radiation that are blocked and passed by optical device 100 as described herein. Such adjustment can enable optical device 100 to act as a wavelength selective optical filter.

In some embodiments, first liquid 106 comprises a first additive (e.g., an ink or a dye) that increases the attenuation of the first liquid over the first wavelength band. For example, the first additive comprises a polar or hydrophilic compound, which can help to improve dissolution of the first additive in first liquid 106 and/or prevent the first additive from dissolving in second liquid 108 (e.g., to prevent the first additive from migrating to the second liquid). Additionally, or alternatively, second liquid 108 comprises a second additive (e.g., an ink or a dye) that increases the attenuation of the second liquid over the second wavelength band. For example, the second additive comprises a non-polar or hydrophobic compound, which can help to improve dissolution of the second additive in second liquid 108 and/or prevent the second additive from dissolving in first liquid 106 (e.g., to prevent the second additive from migrating to the first liquid). In some embodiments, the first additive comprises an azobenzene (e.g., chrysoidine), an athraquinone (e.g., alizarin), a xanthene (e.g., fluorescein), a triphenylmethane (e.g., pararosaniline), another suitable additive, or combinations thereof. Additionally, or alternatively, the second additive comprises an anthroquinone (e.g., anthrapyrimidine yellow, flavanthrone yellow, anthanthrone orange, isoviolanthrone violet, indanthrone blue-reddish, and/or indanthrone blue), a boron-dipyrromethene (BODIPY), Oil Red O dye, nigrosin, another suitable additive, or combinations thereof. Although the exemplary first additives are described as polar, and the exemplary second additives are described as non-polar, other embodiments are included in this disclosure. For example, any of the additives described for use as the first additive can be used as the second additive, and any of the additives described for use as the second additive can be used as the first additive, although some modification of the respective additives may be beneficial to aid dissolution in the respective liquid.

The attenuation of first liquid 106 and second liquid 108 can depend on the path length of the image radiation through the respective liquid. For example, the attenuation of the image radiation, or a portion thereof, by the respective liquid can be estimated using Beer's law, which can be expressed by Equation (1)

$$A = \varepsilon bc \quad (1)$$

where A is the absorbance of the respective liquid, $\varepsilon$ is the molar attenuation coefficient of the attenuating additive in the respective liquid, b is the path length through the respective liquid, and c is the concentration of the attenuating additive in the respective liquid. The transmission of the image radiation, or a portion thereof, by the respective liquid can be estimated from the absorbance using Equation (2)

$$A = -\log T = \log(1/T) \quad (2)$$

where A is the absorbance of the respective liquid, and T is the transmission of the respective liquid. The absorbance and/or transmission values can be reported at a particular wavelength and/or over a particular wavelength band.

In some embodiments, the attenuation and/or transmission of optical device 100 can be adjusted by adjusting the path length of the image radiation through first liquid 106 and/or second liquid 108. The path length through first liquid 106 or second liquid 108 can be described as the linear distance through the respective liquid along optical axis 112 of optical device 100. For example, FIG. 4 shows optical device 100 with interface 110 in the first position in which image radiation enters optical device 100 through first window 114, passes through first liquid 106, the interface, and second liquid 108, and exits the optical device through second window 116. With interface 110 in the first position, each of a first path length 146 through first liquid 106 and a second path length 148 through second liquid 108 is sufficiently long that optical device 100 blocks each of a first portion of the image radiation within the first wavelength band and a second portion of the image radiation within the second wavelength band. With interface 110 in the first position, first path length 146 and second path length 148 can be equal or substantially equal as shown in FIG. 4 or can be unequal. Additionally, or alternatively, with interface 110 in the first position, the interface can be flat or substantially flat as shown in FIG. 4 or can be curved (e.g., in a concave or convex direction).

Although first path length 146 and second path length 148 with interface 110 in the first position are described in reference to FIG. 4 as being sufficiently long that optical device 100 blocks each of the first portion of the image radiation within the first wavelength band and the second portion of the image radiation within the second wavelength band, other embodiments are included in this disclosure. For example, in some embodiments, with interface 110 in the first position, each of first path length 146 through first liquid 106 and second path length 148 through second liquid 108 is sufficiently short that optical device 100 passes each of the first portion of the image radiation within the first wavelength band and the second portion of the image radiation within the second wavelength band. Thus, with interface 110 in the first position, optical device can be open with respect to both the first wavelength band and the second wavelength band or closed to both the first wavelength band and the second wavelength band.

FIG. 5 shows optical device 100 with interface 110 in the second position in which image radiation enters optical device 100 through first window 114, passes through first liquid 106, the interface, and second liquid 108, and exits the optical device through second window 116. With interface 110 in the second position, first path length 146 through first liquid 106 is sufficiently long that optical device 100 blocks the first portion of the image radiation within the first wavelength band, and second path length 148 through second liquid 108 is sufficiently short that the optical device passes the second portion of the image radiation within the second wavelength band.

In some embodiments, interface 110 is moved from the first position shown in FIG. 4 to the second position shown in FIG. 5 by decreasing the voltage differential between common electrode 124 and driving electrode 126, which can decrease the wettability of the sidewalls of cavity 104 with respect to first liquid 106. Such movement of interface 110 can decrease second path length 148 sufficiently for optical device 100 to pass the second portion of the image radiation within the second wavelength band and/or increase first path length 146 sufficiently for the optical device to block the first portion of the image radiation within the first wavelength band.

FIG. 6 shows optical device 100 with interface 110 in the third position in which image radiation enters optical device 100 through first window 114, passes through first liquid 106, the interface, and second liquid 108, and exits the optical device through second window 116. With interface 110 in the third position, first path length 146 through first liquid 106 is sufficiently short that optical device 100 passes the first portion of the image radiation within the first wavelength band, and second path length 148 through second liquid 108 is sufficiently long that the optical device blocks the second portion of the image radiation within the second wavelength band.

In some embodiments, interface 110 is moved from the first position shown in FIG. 4 to the third position shown in FIG. 6 by increasing the voltage differential between common electrode 124 and driving electrode 126, which can increase the wettability of the sidewalls of cavity 104 with respect to first liquid 106. Such movement of interface 110 can decrease first path length 146 sufficiently for optical device 100 to pass the first portion of the image radiation within the first wavelength band and/or increase second path length 148 sufficiently for the optical device to block the second portion of the image radiation within the second wavelength band.

Figure 7:
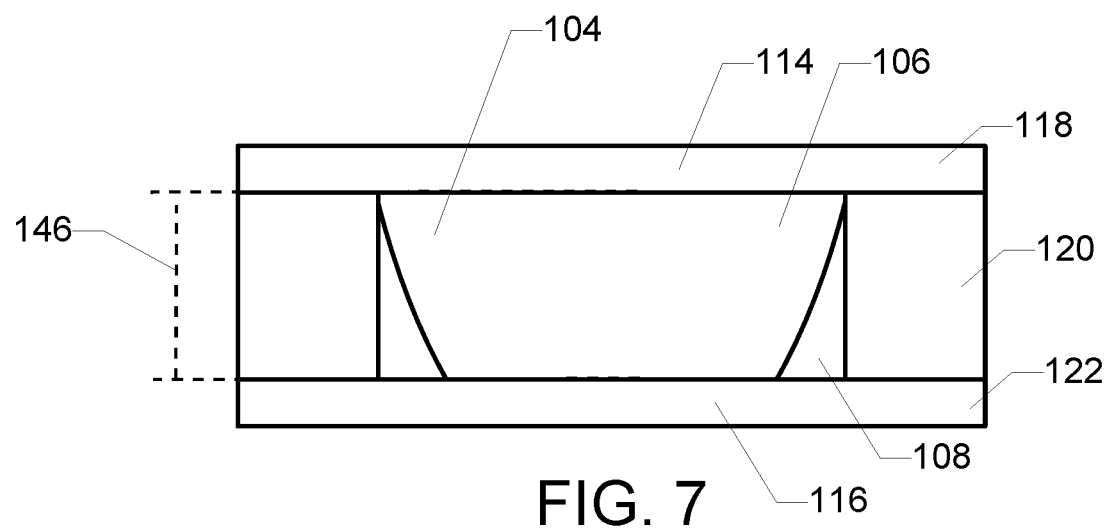
FIGS. 7-8 are schematic cross-sectional views of some embodiments of an optical device with a liquid interface in second and third positions, respectively.
Figure 8:
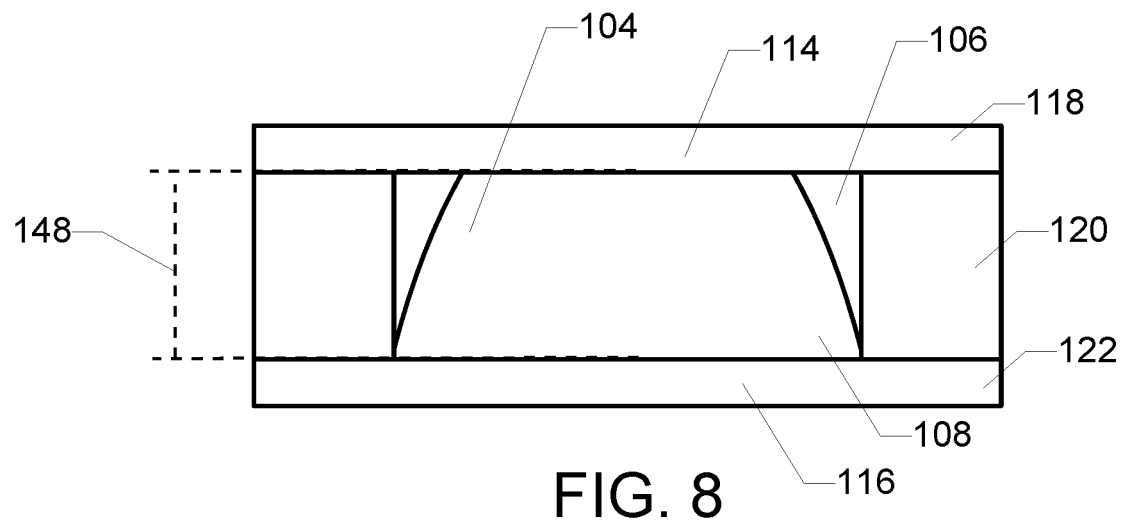

FIGS. 7-8 are schematic cross-sectional views of some embodiments of optical device 100 with interface 110 in second and third positions, respectively. In some of such embodiments, optical device 100 can function as a selective optical shutter as described herein. In some embodiments, the attenuation and/or transmission of optical device 100 can be adjusted by removing one of first liquid 106 or second liquid 108 from the optical path through the optical device. For example, FIG. 7 shows optical device 100 with interface 110 in the second position in which image radiation enters optical device 100 through first window 114, passes through first liquid 106, and exits the optical device through second window 116, without passing through second liquid 108 or the interface. With interface 110 in the second position, first path length 146 through first liquid 106 is sufficiently long that optical device 100 blocks the first portion of the image radiation within the first wavelength band, and the image radiation does not pass through second liquid 108 such that the optical device passes the second portion of the image radiation within the second wavelength band.

In some embodiments, interface 110 is moved from the first position shown in FIG. 4 to the second position shown in FIG. 7 by decreasing the voltage differential between common electrode 124 and driving electrode 126, which can decrease the wettability of the sidewalls of cavity 104 with respect to first liquid 106. Such movement of interface 110 can cause the interface to move into contact with an interior surface of second window 116 such that first liquid 106 contacts the second window, and second liquid 108 is removed from the optical path through optical device 100. For example, second liquid 108 is pushed to a peripheral region of cavity 104 such that image radiation passing through a central region of the cavity passes through optical device 100 without passing through the second liquid as described herein.

FIG. 8 shows optical device 100 with interface 110 in the third position in which image radiation enters optical device 100 through first window 114, passes through second liquid 108, and exits the optical device through second window 116, without passing through first liquid 106 or the interface. With interface 110 in the third position, the image radiation does not pass through first liquid 106 such that optical device 100 passes the first portion of the image radiation within the first wavelength band, and second path length 148 through second liquid 108 is sufficiently long that the optical device blocks the second portion of the image radiation within the second wavelength band.

In some embodiments, interface 110 is moved from the first position shown in FIG. 4 to the third position shown in FIG. 8 by increasing the voltage differential between common electrode 124 and driving electrode 126, which can increase the wettability of the sidewalls of cavity 104 with respect to first liquid 106. Such movement of interface 110 can cause the interface to move into contact with an interior surface of first window 114 such that second liquid 108 contacts the first window, and first liquid 106 is removed from the optical path through optical device 100. For example, first liquid 106 is pushed to a peripheral region of cavity 104 such that image radiation passing through a central region of the cavity passes through optical device 100 without passing through the first liquid as described herein.

In some respects, removing one of first liquid 106 or second liquid 108 from the optical path through the optical device can be considered adjusting the path length of the image radiation through first liquid 106 or second liquid 108. For example, removing first liquid 106 from the optical path can be considered reducing first path length 146 through the first liquid to zero or substantially zero while increasing second path length 148 through second liquid 108 to a length that is equal or substantially equal to a height of cavity 104. Additionally, or alternatively, removing second liquid 108 from the optical path can be considered reducing second path length 148 through the second liquid to zero or substantially zero while increasing first path length 146 through first liquid 106 to a length that is equal or substantially equal to a height of cavity 104.

Figure 9:
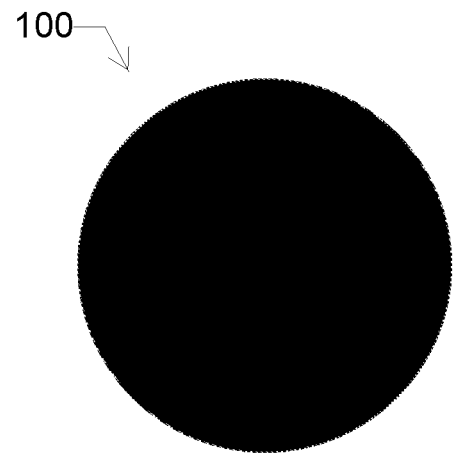
FIGS. 9-10 are schematic top views of some embodiments of an optical device in closed and open configurations, respectively.
Figure 10:
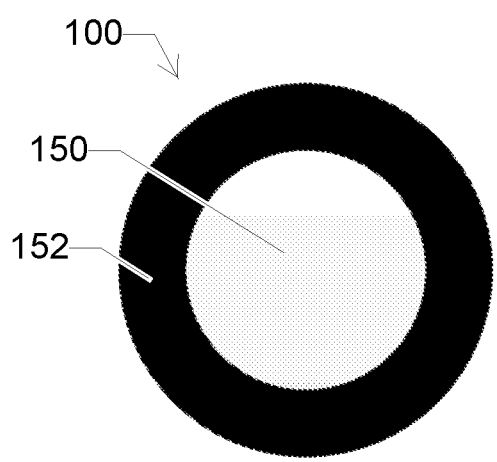

FIGS. 9-10 are schematic top views of some embodiments of optical device 100 in closed and open configurations, respectively, with respect to the first wavelength band. In the closed configuration shown in FIG. 9, optical device 100 blocks the first portion of the image radiation within the first wavelength band. For example, in the closed configuration, interface 100 is in the first position shown in FIG. 4, the second position shown in FIG. 5, or the second position shown in FIG. 7. In the open configuration shown in FIG. 10, the optical device passes the first portion of the image radiation within the first wavelength band. For example, in the open configuration, interface 100 is in the third position shown in FIG. 6 or the third position shown in FIG. 8. In some embodiments, in the open configuration, a central region 150 of optical device 100 passes the first portion of the image radiation within the first wavelength band, and a peripheral region 152 of the optical device blocks the first portion of the image radiation within the first wavelength band. Such blockage of the first portion of the image radiation within the first wavelength band in the peripheral region can be caused by a relatively thicker body of first liquid 106 in the peripheral region (e.g., as a result of the curvature of interface 110 as shown in FIGS. 6 and 8) that sufficiently attenuates the image radiation within the peripheral region to prevent passage of the first portion of the image radiation in the peripheral region. Thus, in the open configuration, central region 150 can serve as an open aperture of optical device 100 functioning as a selective optical shutter as described herein. The terms "open" and "closed" can be used with reference to a particular wavelength band without regard to whether optical device 100 blocks or passes image radiation outside of the particular wavelength band. For example, in the closed configuration, optical device 100 can block or pass image radiation outside of the first wavelength band. Similarly, in the open configuration, optical device 100 can block or pass image radiation outside of the first wavelength band.

Figure 11:
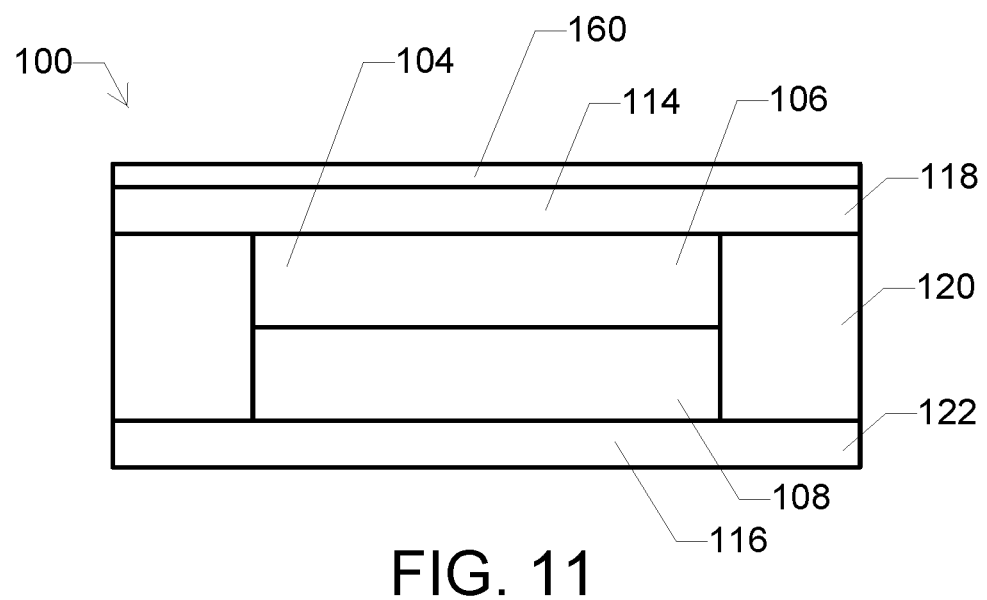
FIG. 11 is a schematic cross-sectional view of some embodiments of an optical device comprising a filter disposed in an optical path of the optical device.

FIG. 11 is a schematic cross-sectional view of some embodiments of optical device 100 comprising a filter 160 disposed in an optical path of the optical device. In some embodiments, filter 160 comprises an IR cut filter. For example, filter 160 blocks (e.g., by absorption, reflection, and/or another attenuation mechanism) electromagnetic radiation within the IR spectrum, or a portion thereof, (e.g., wavelengths of about 720 nm to about 1000 nm) from passing through optical device 100. Additionally, or alternatively, filter 160 comprises a UV filter. For example, filter 160 blocks electromagnetic radiation within the UV spectrum, or a portion thereof, (e.g., wavelengths of less than about 450 nm or less than about 350 nm) from passing through optical device 100.

In some embodiments, filter 160 is disposed on or integrated with first window 114 and/or second window 116. For example, filter 160 is disposed on an exterior surface of first window 114 as shown in FIG. 11. In some embodiments, filter 160 is integrated with first window 114. For example, first window 114 can be formed from a material that attenuates electromagnetic radiation within a particular wavelength band (e.g., blue glass that absorbs IR radiation). In some embodiments, filter 160 is disposed on or integrated with second window 116 as described in reference to first window 114. In some embodiments, filter 160 comprises a plurality of filter segments. The plurality of filter segments can be disposed on or integrated with first window 114 or second window 116. Additionally, or alternatively, a portion of the plurality of filter segments can be disposed on or integrated with first window 114, and a portion of the plurality of filter segments can be disposed on or integrated with second window 116. Different filter segments can attenuate different portions of the particular wavelength band such that filter 160 attenuates the particular wavelength band as intended.

In some embodiments, filter 160 comprises a dielectric stack. For example, the dielectric stack comprises alternating layers of high and low refractive index materials with suitable thicknesses to reflect radiation in one or more particular wavelength bands or ranges (e.g., IR and/or UV radiation). Additionally, or alternatively, filter 160 comprises an absorptive material that absorbs radiation in one or more particular wavelength bands or ranges (e.g., NIR radiation). Thus, filter 160 can serve as a bandpass filter that transmits visible light and reflects and/or absorbs one or more of IR, NIR, and/or UV radiation.

Figure 12:
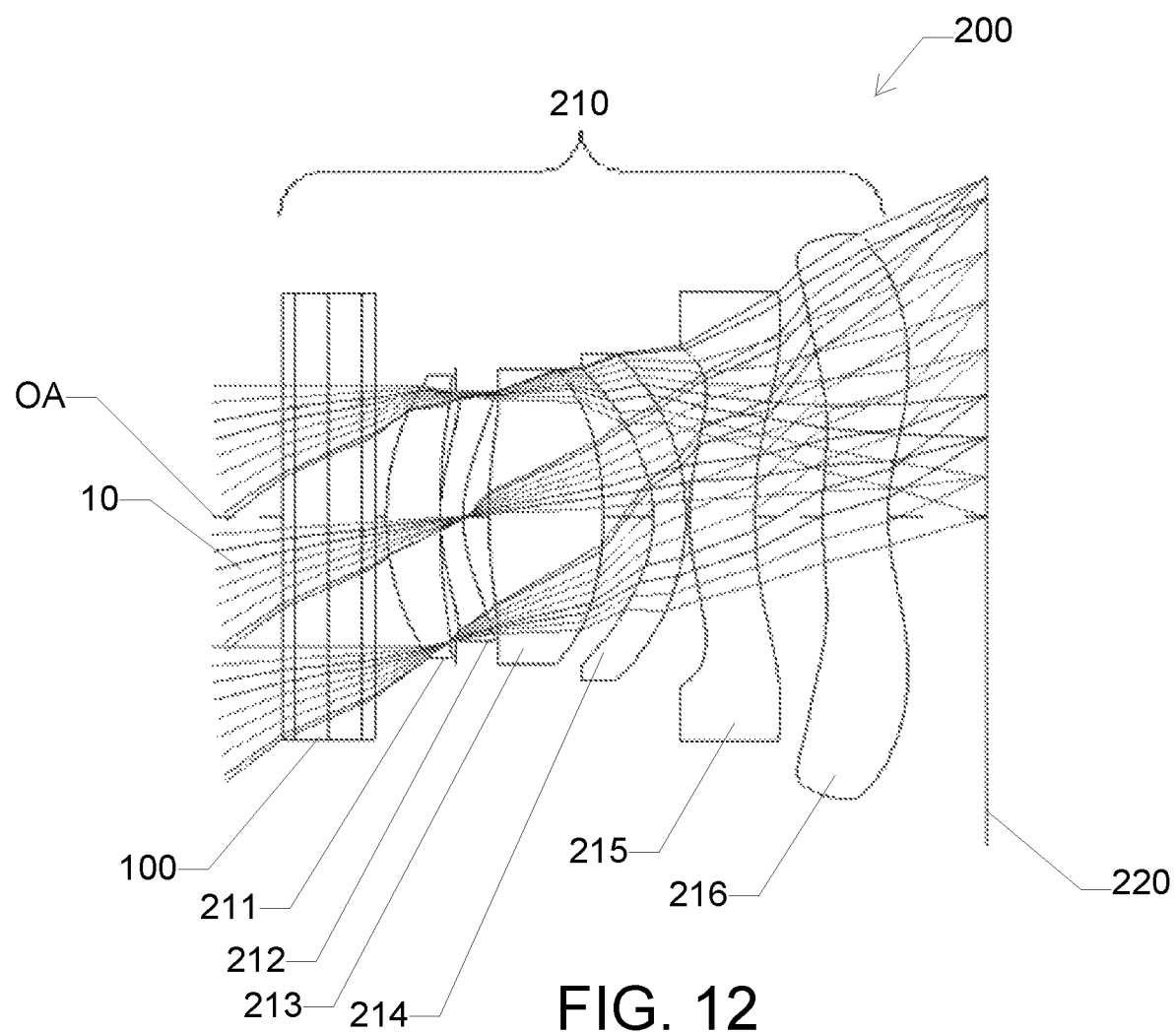
FIG. 12 is a schematic view of some embodiments of an imaging device comprising an optical device.

FIG. 12 is a schematic view of some embodiments of an imaging device 200. Imaging device 200 comprises an optical system 210 and an image sensor 220. Optical system 210 can be positioned to focus image radiation 10 on image sensor 220 as shown in FIG. 12. Imaging device 200 can be configured as a digital camera, a ranging device, a surveying device, another suitable detection device, or a combination thereof.

In some embodiments, optical system 210 comprises a plurality of lenses. For example, in the embodiments shown in FIG. 12, optical system 210 comprises, in order from an object side to an image side, a first lens 211, a second lens 212, a third lens 213, a fourth lens 214, a fifth lens 215, and a sixth lens 216. The plurality of lenses can be aligned along an optical axis OA of optical system 210.

Although optical system 210 described herein in reference to FIG. 12 comprises six lenses, other embodiments are included in this disclosure. For example, in other embodiments, optical system 210 comprises one, two, three, four, five, seven, or more lenses.

In some embodiments, optical system 210 comprises a variable focus lens (e.g., in addition to or in place of one of the first, second, third, fourth, fifth, or sixth lenses). For example, the variable focus lens is a liquid lens or a fluid lens that functions based on electrowetting. The focus of the liquid lens or fluid lens can be changed by changing the shape of the interface between the different liquids contained within the lens and without translating, tilting, or otherwise moving optical system 210 relative to image sensor 220. Additionally, or alternatively, the variable focus lens is a hydrostatic fluid lens comprising a fluid disposed within a flexible membrane. The focus of the hydrostatic fluid lens can be changed by changing the hydrostatic pressure of the fluid, and thus the curvature of the flexible membrane, and without translating, tilting, or otherwise moving the optical system relative to the image sensor. In other embodiments, the variable focus lens is another type of lens having a focal length that can be changed without translating, tilting, or otherwise moving the optical system relative to the image sensor. The variable focus lens can enable imaging device 200 to perform autofocus and/or OIS functions.

In some embodiments, optical system 210 and image sensor 220 are translatable relative to each other. For example, optical system 210 can be mounted on a mechanical actuator (e.g., a voice coil motor) to cause translation of the optical system relative to image sensor 220. Such translation can enable imaging device 200 to perform autofocus and/or OIS functions.

In some embodiments, imaging device 200 comprises optical device 100. For example, optical device 100 functions as a wavelength selective optical shutter as described herein. Optical device 100 can be disposed at an object end of optical system 210 as shown in FIG. 12 or at another location within or adjacent the optical system. Additionally, or alternatively, optical axis 112 of optical device 100 can be generally aligned with optical axis OA of optical system 210.

In some embodiments, imaging device 200 functions as a combined visible camera and LiDAR sensor. For example, optical device 100 can enable selective transmission of visible light (e.g., for camera functionality) and UV or IR light (e.g., for LiDAR functionality) to be directed through optical system 210 to image sensor 220. Such a sensor may be beneficial, for example, for automotive applications.

In some embodiments, imaging device 200 functions as a combined visible camera or display and distance measuring sensor. For example, optical device 100 can enable selective transmission of visible light (e.g., for camera or display functionality) and UV or IR light (e.g., for distance measuring functionality by, for example, time of flight or structured light) to be directed through optical system 210 to image sensor 220. Such a sensor may be beneficial, for example, for augmented reality applications. For example, in such applications, it may be beneficial to be able to selectively turn off, shutter, modulate, or block a display function (e.g., an augmented object projected onto a scene) while continuously monitoring a depth of the objects in the scene.

In various embodiments in which imaging device 200 performs different functions using radiation of different wavelengths, optical device 100 can enable selective transmission of particular wavelengths, thereby enabling use of common optical elements (e.g., lenses or image sensors) for the different functions. For example, imaging device 200 can alternately pass and block the different wavelengths to alternately direct the different wavelengths to image sensor 220. Such use of common optical elements can enable the package size of imaging device 200 to be reduced compared to a device with separate components for the different functions.

In some embodiments, upon passing image radiation through optical device 100 in the direction from the object side of the optical device toward the image side of the optical device, adjusting the voltage differential between common electrode 124 and driving electrode 126 causes movement of liquid interface 110 between (a) the first position in which the optical device blocks each of the first portion of the image radiation falling within the first wavelength band and the second portion of the image radiation falling within the second wavelength band or passes each of the first portion of the image radiation falling within the first wavelength band and the second portion of the image radiation falling within the second wavelength band and (b) the second position in which the optical device blocks one of the first portion of the image radiation falling within the first wavelength band or the second portion of the image radiation falling within the second wavelength band and passes the other of the first portion of the image radiation falling within the first wavelength band or the second portion of the image radiation falling within the second wavelength band.

Although the first position generally is described herein as the position of interface 120 in which optical device 100 blocks or passes both the first portion of the image radiation falling within the first wavelength band and the second portion of the image radiation falling within the second wavelength band, the second position and the third position can describe either the position of the interface in which the optical device blocks the first portion of the image radiation falling within the first wavelength band and passes the second portion of the image radiation falling within the second wavelength band or the position of the interface in which the optical device passes the first portion of the image radiation falling within the first wavelength band and blocks the second portion of the image radiation falling within the second wavelength band. For example, the first position can be the position shown in FIG. 4, and the second position can be the position shown in FIG. 5 or the position shown in FIG. 7. Additionally, or alternatively, the first position can be the position shown in FIG. 4, and the second position can be the position shown in FIG. 6 or the position shown in FIG. 8.

In some embodiments, in the first position, first liquid 106 is disposed between second liquid 108 and first window 114, and second liquid 108 is disposed between the first liquid and second window 116, whereby the image radiation passes through each of the first window, the first liquid, the second liquid, and the second window.

In some embodiments, in the second position, first liquid 106 contacts second window 116, whereby the image radiation passes through each of first window 114, the first liquid, and the second window, without passing through second liquid 108. Additionally, or alternatively, in the second position, second liquid 108 contacts first window 114, whereby the image radiation passes through each of the first window, the second liquid, and second window 116, without passing through first liquid 106.

In some embodiments, in each of the first position and the second position, second liquid 108 is disposed between first liquid 106 and second window 116, whereby the image radiation passes through each of first window 114, the first liquid, the second liquid, and the second window, first path length 146 through the first liquid in the second position is greater than the first path length through the first liquid in the first position, and second path length 148 through the second liquid in the second position is less than the second path length through the second liquid in the first position. Additionally, or alternatively, in the first position, first liquid 106 passes the first portion of the image radiation falling within the first wavelength band, and in the second position, the first liquid blocks the first portion of the image radiation falling within the first wavelength band. Additionally, or alternatively, in the first position, second liquid 108 blocks the second portion of the image radiation falling within the second wavelength band, and in the second position, the second liquid passes the second portion of the image radiation falling within the second wavelength band.

In some embodiments, in each of the first position and the second position, first liquid 106 is disposed between second liquid 108 and first window 114, whereby the image radiation passes through each of the first window, the first liquid, the second liquid, and second window 116, first path length 146 through the first liquid in the second position is less than the first path length through the first liquid in the first position, and second path length 148 through the second liquid in the second position is greater than the second path length through the second liquid in the first position. Additionally, or alternatively, in the first position, first liquid 106 blocks the first portion of the image radiation falling within the first wavelength band, and in the second position, the first liquid passes the first portion of the image radiation falling within the first wavelength band. Additionally, or alternatively, in the first position, second liquid 108 passes the second portion of the image radiation falling within the second wavelength band, and in the second position, the second liquid blocks the second portion of the image radiation falling within the second wavelength band.

In some embodiments, adjusting the voltage differential between common electrode 124 and driving electrode 126 causes movement of liquid interface 110 between (a) the first position, (b) the second position, and (c) a third position in which optical device 100 passes the one of the first portion of the image radiation falling within the first wavelength band or the second portion of the image radiation falling within the second wavelength band and blocks the other of the first portion of the image radiation falling within the first wavelength band or the second portion of the image radiation falling within the second wavelength band. For example, the first position can be the position shown in FIG. 4, the second position can be one of the position shown in FIG. 5 or the position shown in FIG. 6, and the third position can be the other of the position shown in FIG. 5 or the position shown in FIG. 6. Additionally, or alternatively, the first position can be the position shown in FIG. 4, the second position can be one of the position shown in FIG. 7 or the position shown in FIG. 8, and the third position can be the other of the position shown in FIG. 7 or the position shown in FIG. 8. Additionally, or alternatively, the first position can be the position shown in FIG. 4, the second position can be one of the position shown in FIG. 5 or the position shown in FIG. 8, and the third position can be the other of the position shown in FIG. 5 or the position shown in FIG. 8. Additionally, or alternatively, the first position can be the position shown in FIG. 4, the second position can be one of the position shown in FIG. 7 or the position shown in FIG. 6, and the third position can be the other of the position shown in FIG. 7 or the position shown in FIG. 6.

In some embodiments, first liquid 106 comprises a first additive that increases attenuation of electromagnetic radiation within the first wavelength band. Additionally, or alternatively, second liquid 108 comprises a second additive that increases attenuation of electromagnetic radiation within the second wavelength band.

In some embodiments, one of: (a) the first wavelength band extends from about 10 nm to about 390 nm (e.g., UV radiation), and the second wavelength band extends from about 700 nm to about 1000 nm (e.g., UV radiation); or (b) the first wavelength band extends from about 700 nm to about 1000 nm (e.g., IR radiation), and the second wavelength band extends from about 10 nm to about 390 nm (e.g., UV radiation).

In some embodiments, upon passing the image radiation through optical device 100 in the direction from the object side of the optical device toward the image side of the optical device in each of the first position and the second position, the optical device passes a third portion of the image radiation falling within a third wavelength band. Additionally, or alternatively, the third wavelength band extends from about 390 nm to about 700 nm (e.g., visible light).

In some embodiments, one of: (a) the first wavelength band extends from about 10 nm to about 390 nm (e.g., UV radiation) or from about 700 nm to about 1000 nm (e.g., IR radiation), and the second wavelength band extends from about 390 nm to about 700 nm (e.g., visible light); or (b) the first wavelength band extends from about 390 nm to about 700 nm (e.g., visible light), and the second wavelength band extends from about 10 nm to about 390 nm (e.g., UV radiation) or from about 700 nm to about 1000 nm (e.g., IR radiation). Additionally, or alternatively, optical device 100 comprises filter 160 disposed in an optical path of the optical device, wherein upon passing the image radiation through the optical device in the direction from the object side of the optical device toward the image side of the optical device, one of: (a) the first wavelength band or the second wavelength band extends from about 10 nm to about 390 nm (e.g., UV radiation), and the filter absorbs a portion of the image radiation falling within a wavelength band extending from about 700 nm to about 1000 nm (e.g., IR radiation); or (b) the first wavelength band or the second wavelength band extends from about 700 nm to about 1000 nm (e.g., IR radiation), and the filter absorbs a portion of the image radiation falling within a wavelength band extending from about 10 nm to about 390 nm (e.g., UV radiation).

In some embodiments, a selective optical shutter comprises filter 160 disposed in an optical path of the optical shutter, whereby the filter blocks of one of ultraviolet (UV) light or infrared (IR) light and passes each of visible light and the other of UV light or IR light, and liquid interface 110 is adjustable by electrowetting to selectively pass visible light or the other of UV light or IR light. Additionally, or alternatively, filter 160 is disposed on or integrated with first window 114 or second window 116. Additionally, or alternatively, liquid interface 110 is adjustable by electrowetting between: (a) a first position in which the optical shutter blocks each of visible light and the other of UV light or IR light, (b) a second position in which the optical shutter passes visible light and blocks the other of UV light or IR light, and (c) a third position in which the optical shutter blocks visible light and passes the other of UV light or IR light.

EXAMPLES

Various embodiments will be further clarified by the following examples.

Example 1

A second attenuating additive was dissolved in a second liquid, and the contact angle of the second liquid with the second attenuating additive dissolved therein was measured on a Parylene C surface in air. The second liquid was an oil material, and the second attenuating additive was Oil Red O dye. The second liquid with the second attenuating additive dissolved therein was passed through a 0.2 μm filter prior to measuring the contact angle.

Figure 13:
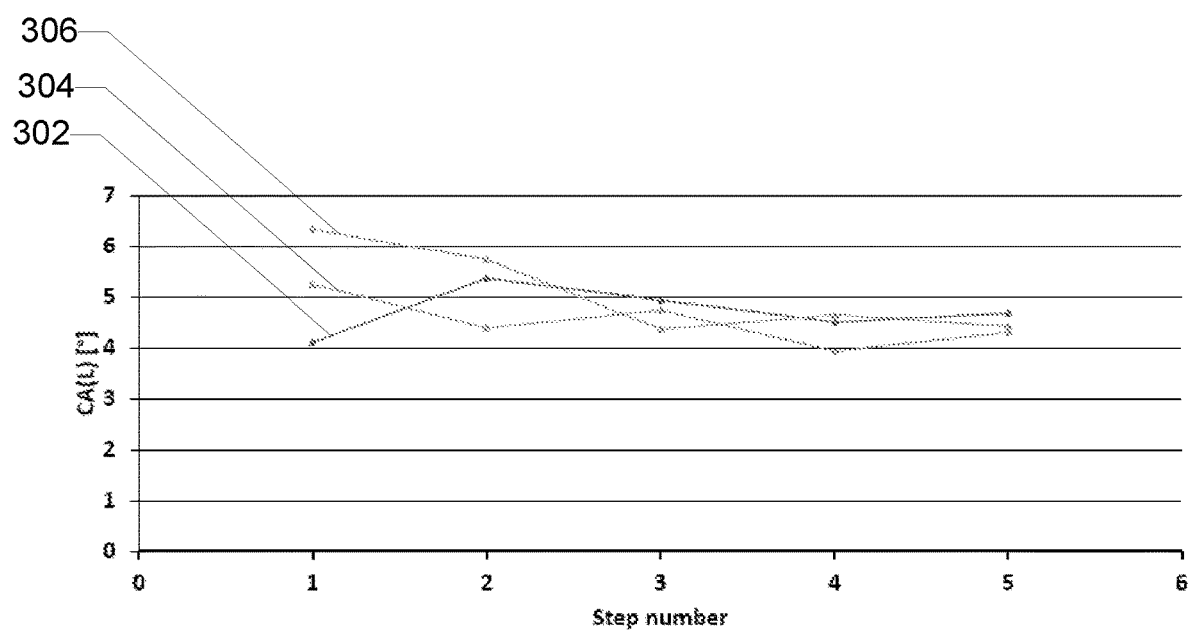
FIG. 13 is a plot showing measured contact angles for a plurality of samples.

FIG. 13 is a plot showing the measured contact angles for a plurality of samples, labeled as different step numbers. Curve 302 corresponds to the second liquid without the second attenuating additive. Curve 304 corresponds to the second liquid with 0.2 mg/mL of the second attenuating additive. Curve 306 corresponds to the second liquid with 0.5 mg/mL of the second attenuating additive.

Comparison of curves 302, 304, and 306 illustrates that the addition of the second attenuating additive to the second liquid had little or no effect on the interfacial surface energy of the base second liquid material, which further illustrates that the electrowetting functionality of optical device 100 is not substantially affected by the presence of the second attenuating additive.

Example 2

An optical device having the general configuration shown in FIG. 1 was prepared. A first attenuating additive was dissolved in the first liquid, and a second attenuating additive was dissolved in the second liquid. The first liquid was an aqueous polar material, and the first attenuating additive was fluorescein. The second liquid was an oil material, and the second attenuating additive was BODIPY.

Figure 14:
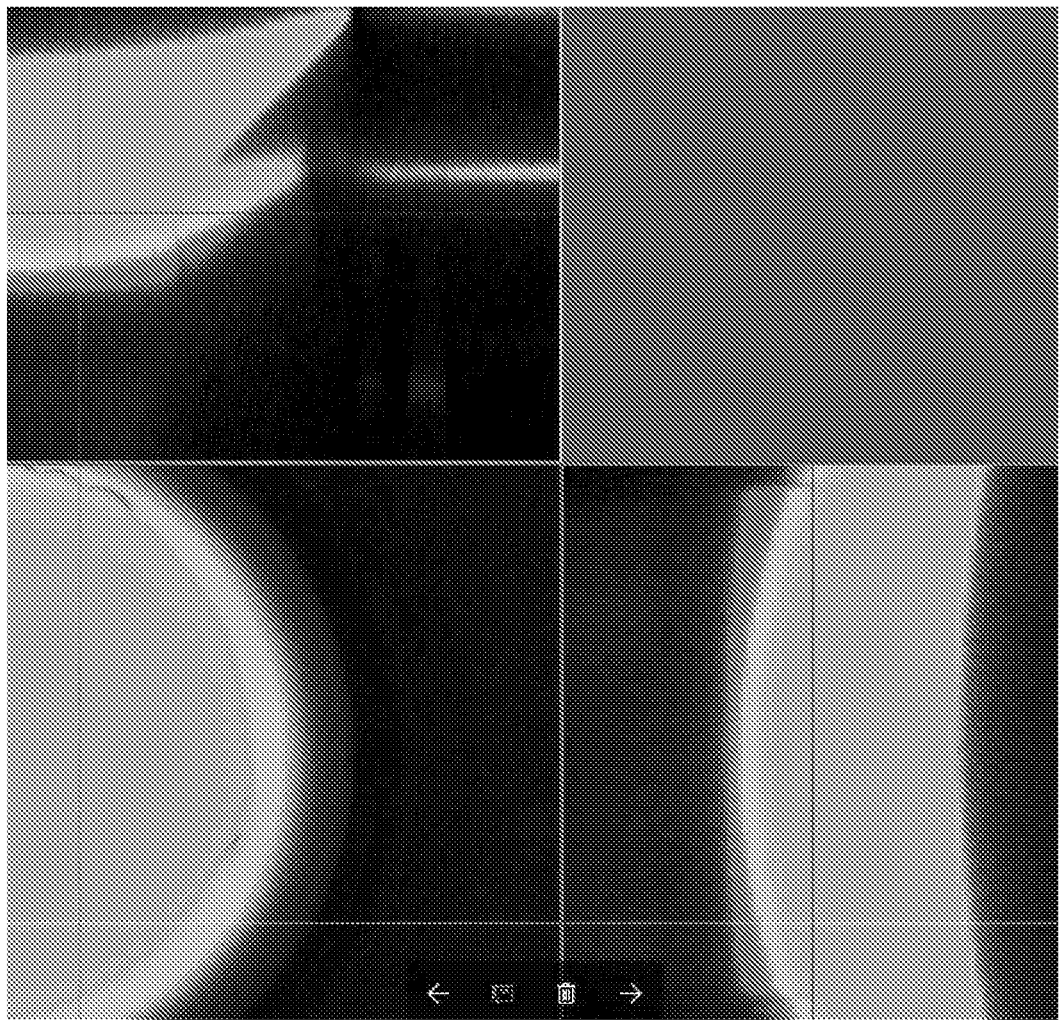
FIG. 14 is a confocal fluorescent image of some embodiments of an optical device with a first liquid comprising a first additive doped therein and a second liquid comprising a second additive doped therein.

FIG. 14 is a confocal fluorescent image of the optical device with the first liquid comprising the first additive doped therein and the second liquid comprising the second additive doped therein. The green color represents the first additive doped into the first liquid, and the red color represents the second additive doped into the second liquid. The yellow color is observed where the first and second liquids overlap and are present. The first and second additives have different spectral absorbances as well as different fluorescent spectral properties, which combine to give the image shown in FIG. 14. Thus, different wavelengths are blocked and passed in different regions of the optical device with different thicknesses of the first and second liquids.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. An optical device, comprising:
a first window, a second window, and a cavity disposed between the first window and the second window;
a first liquid and a second liquid disposed within the cavity;
a liquid interface between the first liquid and the second liquid;
a common electrode in electrical communication with the first liquid; and
a driving electrode disposed on a sidewall of the cavity and insulated from the first liquid and the second liquid;
wherein the first liquid is attenuating of electromagnetic radiation within a first wavelength band;
wherein the second liquid is attenuating of electromagnetic radiation within a second wavelength band that is different than the first wavelength band; and
wherein upon passing image radiation through the optical device in a direction from an object side of the optical device toward an image side of the optical device, adjusting a voltage differential between the common electrode and the driving electrode causes movement of the liquid interface between (a) a first position in which the optical device blocks each of a first portion of the image radiation falling within the first wavelength band and a second portion of the image radiation falling within the second wavelength band or passes each of the first portion of the image radiation falling within the first wavelength band and the second portion of the image radiation falling within the second wavelength band and (b) a second position in which the optical device blocks one of the first portion of the image radiation falling within the first wavelength band or the second portion of the image radiation falling within the second wavelength band and passes the other of the first portion of the image radiation falling within the first wavelength band or the second portion of the image radiation falling within the second wavelength band.

2. The optical device of claim 1, wherein in the first position, the first liquid is disposed between the second liquid and the first window, and the second liquid is disposed between the first liquid and the second window, whereby the image radiation passes through each of the first window, the first liquid, the second liquid, and the second window.

3. The optical device of claim 1, wherein in the second position, the first liquid contacts the second window, whereby the image radiation passes through each of the first window, the first liquid, and the second window, without passing through the second liquid.

4. The optical device of claim 1, wherein in the second position, the second liquid contacts the first window, whereby the image radiation passes through each of the first window, the second liquid, and the second window, without passing through the first liquid.

5. The optical device of claim 1, wherein:
in each of the first position and the second position, the second liquid is disposed between the first liquid and the second window, whereby the image radiation passes through each of the first window, the first liquid, the second liquid, and the second window;
a first path length through the first liquid in the second position is greater than the first path length through the first liquid in the first position; and
a second path length through the second liquid in the second position is less than the second path length through the second liquid in the first position.

6. The optical device of claim 5, wherein:
in the first position, the first liquid passes the first portion of the image radiation falling within the first wavelength band; and
in the second position, the first liquid blocks the first portion of the image radiation falling within the first wavelength band.

7. The optical device of claim 5, wherein:
in the first position, the second liquid blocks the second portion of the image radiation falling within the second wavelength band; and
in the second position, the second liquid passes the second portion of the image radiation falling within the second wavelength band.

8. The optical device of claim 1, wherein:
in each of the first position and the second position, the first liquid is disposed between the second liquid and the first window, whereby the image radiation passes through each of the first window, the first liquid, the second liquid, and the second window;
a first path length through the first liquid in the second position is less than the first path length through the first liquid in the first position; and
a second path length through the second liquid in the second position is greater than the second path length through the second liquid in the first position.

9. The optical device of claim 8, wherein:
in the first position, the first liquid blocks the first portion of the image radiation falling within the first wavelength band; and
in the second position, the first liquid passes the first portion of the image radiation falling within the first wavelength band.

10. The optical device of claim 8, wherein:
in the first position, the second liquid passes the second portion of the image radiation falling within the second wavelength band; and
in the second position, the second liquid blocks the second portion of the image radiation falling within the second wavelength band.

11. The optical device of claim 1, wherein adjusting the voltage differential between the common electrode and the driving electrode causes movement of the liquid interface between (a) the first position, (b) the second position, and (c) a third position in which the optical device passes the one of the first portion of the image radiation falling within the first wavelength band or the second portion of the image radiation falling within the second wavelength band and blocks the other of the first portion of the image radiation falling within the first wavelength band or the second portion of the image radiation falling within the second wavelength band.

12. The optical device of claim 1, wherein the first liquid comprises a first additive that increases attenuation of electromagnetic radiation within the first wavelength band.

13. The optical device of claim 1, wherein the second liquid comprises a second additive that increases attenuation of electromagnetic radiation within the second wavelength band.

14. The optical device of claim 1, wherein one of:
(a) the first wavelength band extends from about 10 nm to about 390 nm, and the second wavelength band extends from about 700 nm to about 1000 nm; or
(b) the first wavelength band extends from about 700 nm to about 1000 nm, and the second wavelength band extends from about 10 nm to about 390 nm.

15. The optical device of claim 1, wherein upon passing the image radiation through the optical device in the direction from the object side of the optical device toward the image side of the optical device in each of the first position and the second position, the optical device passes a third portion of the image radiation falling within a third wavelength band.

16. The optical device of claim 15, wherein the third wavelength band extends from about 390 nm to about 700 nm.

17. The optical device of claim 1, wherein one of:
(a) the first wavelength band extends from about 10 nm to about 390 nm or from about 700 nm to about 1000 nm, and the second wavelength band extends from about 390 nm to about 700 nm; or
(b) the first wavelength band extends from about 390 nm to about 700 nm, and the second wavelength band extends from about 10 nm to about 390 nm or from about 700 nm to about 1000 nm.

18. The optical device of claim 17, comprising a filter disposed in an optical path of the optical device, wherein upon passing the image radiation through the optical device in the direction from the object side of the optical device toward the image side of the optical device, one of:
(a) the first wavelength band or the second wavelength band extends from about 10 nm to about 390 nm, and the filter absorbs a portion of the image radiation falling within a wavelength band extending from about 700 nm to about 1000 nm; or
(b) the first wavelength band or the second wavelength band extends from about 700 nm to about 1000 nm, and the filter absorbs a portion of the image radiation falling within a wavelength band extending from about 10 nm to about 390 nm.

19. An imaging device comprising the optical device of claim 1.

* * * * *